United States Patent

[11] 3,603,962

[72] Inventor Bernard Joseph Lechner
Princeton, N.J.
[21] Appl. No. 20,570
[22] Filed Mar. 18, 1970
[45] Patented Sept. 7, 1971
[73] Assignee RCA Corporation

[54] COLOR DISPLAY FOR COMPUTER TERMINAL
4 Claims, 4 Drawing Figs.

[52] U.S. Cl. 340/324 A, 178/5.4, 178/6.8, 315/8.5, 315/10, 328/124, 340/165, 340/173, 340/172.5
[51] Int. Cl. G06f 3/14
[50] Field of Search 340/324 A, 173 CR; 315/10, 11, 12, 8.5; 328/123, 124

[56] References Cited

UNITED STATES PATENTS

| | | | |
|---|---|---|---|
| 2,839,679 | 6/1958 | Harris | 328/124 |
| 2,930,981 | 3/1960 | Yando | 328/124 |
| 2,982,814 | 5/1961 | Fine et al. | 178/6.8 |
| 3,345,458 | 10/1967 | Cole et al. | 178/6.8 |
| 3,351,929 | 11/1967 | Wagner | 340/324 A |
| 3,387,084 | 6/1968 | Hine et al. | 178/6.8 |
| 3,396,377 | 8/1968 | Strout | 340/324 A |
| 3,551,589 | 12/1970 | Moskovitz | 178/5.4 |

*Primary Examiner*—John W. Caldwell
*Assistant Examiner*—David L. Trafton
*Attorney*—H. Christoffersen

ABSTRACT: A color display system is disclosed which responds to computer-supplied digital signals representing graphic and alphanumeric material. The digital signals include position information bits and color information bits. The position information bits are used to control the beam deflection means of an electrical storage tube. The color information bits are translated in a digital-to-analog converter to a signal having an amplitude determined by the color information bits. This signal is applied to the video signal input terminal of the electrical storage tube, whereby the graphic material is stored as a pattern of stored charge amplitudes. The graphic material is displayed on a color kinescope having beam deflection means synchronized with the beam deflection means of the electrical storage tube. The amplitude-modulated video output signal from the electrical storage tube is applied to a threshold detector means to generate red, green and blue control signals for application to corresponding terminals of the color kinescope.

INVENTOR.
BERNARD J. LECHNER
BY Carl V. Olson
Attorney

INVENTOR.
BERNARD J. LECHNER
BY Carl V. Olson
Attorney

COLOR DISPLAY FOR COMPUTER TERMINAL

BACKGROUND OF THE INVENTION

An increasingly popular way of conveying information from a digital computer to humans is by means of a display unit including a cathode ray picture tube of the type employed in television receivers. The usefulness of such displays is increased if the display is in color.

In computer controlled display systems, it is desirable to transmit digital information from the computer to the display over economical lines such as telephone lines. It is then necessary to provide for storage of the information at the display terminal for use in refreshing the graphic display on the kinescope.

It is therefore a general object of this invention to provide an improved system of displaying graphic information in color using economical, commercially-available cathode ray devices.

SUMMARY OF THE INVENTION

A computer-controlled display of information in color is provided using a television-type color kinescope. The graphic information for refreshing the kinescope is stored in an electrical storage tube. Graphic information is initially stored in the electrical storage tube as a pattern of charges under the control of computer-supplied digital signals. These digital signals include position information bits which control beam deflection in the storage tube, and color information bits which control the amplitude of the electron beam, and the resulting charges, in the storage tube. When displaying the stored information, the storage tube and kinescope have synchronized deflection means, and the amplitude-modulated electrical signal repeatedly derived from the storage tube is translated to signals which control the on-off condition of the red, green and blue guns in the color kinescope.

DESCRIPTION OF THE PREFERRED EMBODIMENT

Figures 1, 2:
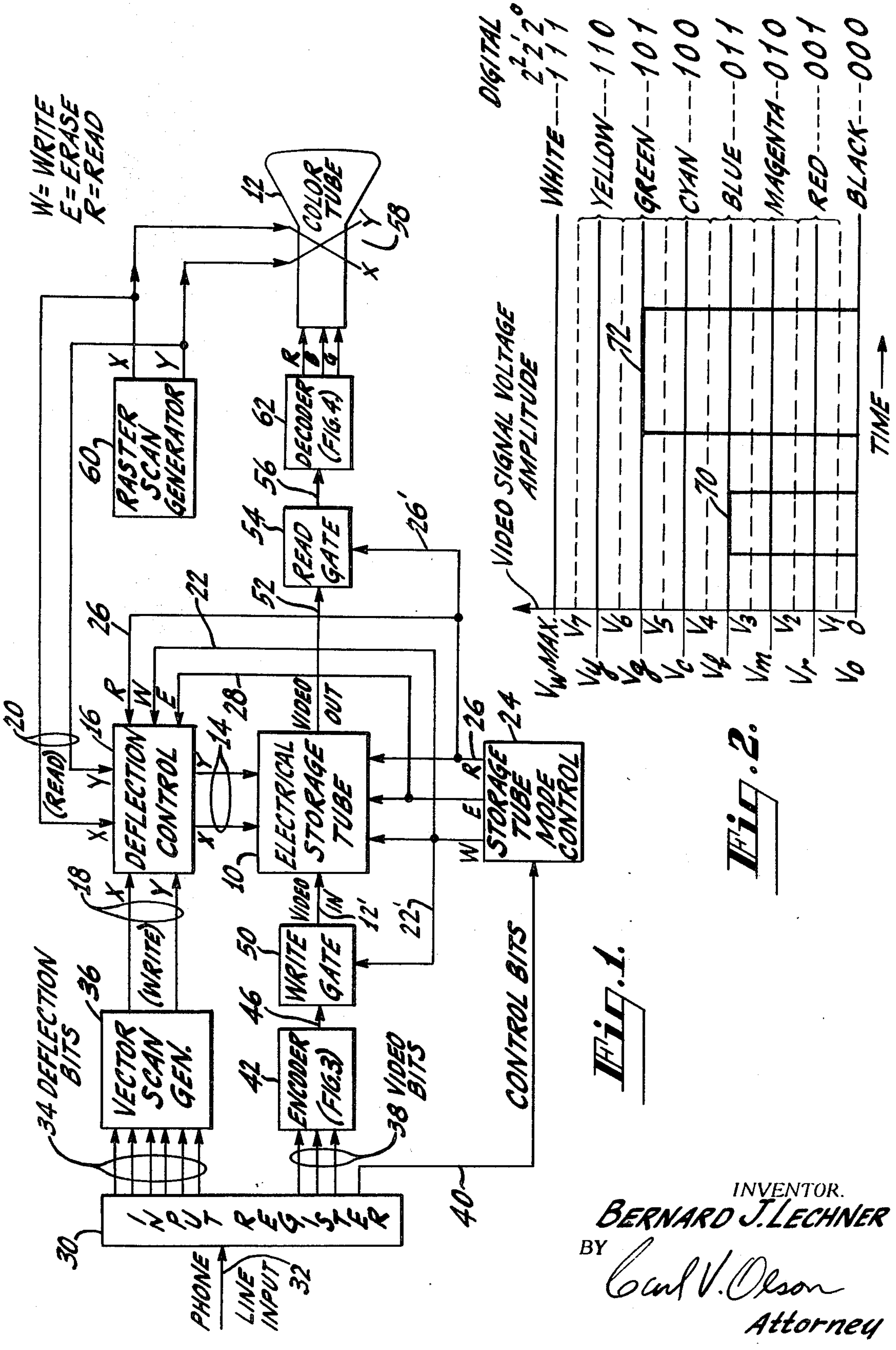
FIG. 1 is a block diagram of a computer-controlled color display system constructed according to the teachings of the invention.
FIG. 2 is a chart which will be referred to in describing the translation of digitally-coded color-representing signals to a corresponding amplitude-modulated color-representing video signal.

Referring now in greater detail to FIG. 1, there is shown a computer-controlled color display system including an electrical storage tube 10 and a color television type Kinescope or picture tube 12. The electrical storage tube may be any suitable cathode ray device having a target structure on which a graphic pattern can be stored in the form of electrical charges, and from which a video output signal can be obtained during repeated scanning of the target by the electron beam. The storage tube may be of the type known as a silicon storage tube; one of which is described in a paper entitled "A Silicon-Dioxide Storage Tube" by R. S. Silver and E. Luedicke appearing on pages 30, 31 of the Digest of Technical Papers of the 1970 IEEE International Solid-State Circuits Conference Feb. 18, 1970. Any other type of storage tube capable of storing various different charge amplitudes, and capable of repeated, nondestructive electrical readout may be used. Known storage tubes retain the stored pattern of charges for from several to many minutes while the information is being readout for the purpose of refreshing the same image on a kinescope.

It is already known to use a storage tube for refreshing a graphic image on a black and white kinescope. As presently used, the storage tube stores graphic information in the form of alphabetic and numeric characters and also lines. The information is normally white information on a black background, or black information on a white background, without any intermediate tones of a gray scale. In accordance with this invention the electrical storage tube is made to store signals in a range of different amplitudes which represent different colors to be reproduced on the color kinescope 12.

The storage tube 10 has a video input line 12' for coupling a video signal to the cathode or grid of the storage tube to control the amplitude or intensity of the electron beam therein. The storage tube 10 also has $x$ and $y$ deflection inputs 14 for controlling the deflection of the electron beam therein. The $x$ and $y$ deflection signals are under the control of a deflection control unit 16. The deflection control unit 16 can supply $x$ and $y$ deflection signals to the storage tube as determined by $x$ and $y$ deflection signals received over lines 18 or, alternatively, over lines 20. The deflection control unit 16 supplies deflection signals from lines 18 to the storage tube when commanded by a write signal W on line 22 from a mode control unit 24. The deflection control unit 16 supplies the deflection signals from lines 20 to the storage tube when commanded to do so by a read signal R over line 26 from the mode control unit 24. In addition to supplying write and read signals, the mode control 24 supplies an erase signal E over line 28 to the storage tube and the deflection control unit 16. The erase may be full screen, in which case deflection signals from lines 20 are used, or selective to a particular spot or region on the target, in which case deflection signals from lines 18 are used. To summarize, the storage tube 10 is a conventional storage means having a video signal input terminal 12,' and having conventional means for deflecting the electron beam in the $x$ and $y$ directions.

Computer generated digital signals representing graphic information are supplied to an input register 30 over an input line 32 which may be a telephone line. If the digital information arrives serially on a single conductor, the input register 30 may include a serial-to-parallel converter so that plurality of deflection bits will be simultaneously available for transfer over lines 34 to a vector scan generator 36. The vector scan generator 36 may be a known equipment such as is described in an article by James C. Miller and Charles M. Wine entitled "A Simple Display for Characters and Gfaphics" appearing in the IEEE Transactions on Computers, Volume C-17, No. 5, May 1968. The vector scan generator 36 translates the received binary deflection bits 34 and generates $x$ and $y$ deflection waveforms for application into the deflection control unit 16 to the deflection means of the storage tube 10.

The digital information supplied to input register 30 also includes three binary color-representing bits available from the register on lines 38, and control bits available on line 40 for application to the storage tube mode control 24.

The binary color-representing bit signals on lines 38 are supplied to a digital-to-analog converter or encoder 42, in which the digital signal is translated to an analog signal of corresponding amplitude. When three binary bits are used on the three lines 38, it is possible to specify eight different colors. This is shown in FIG. 2 where the various combinations of the three-bit signal are related to eight different voltage amplitudes, which in turn are related to eight different colors extending from black through discrete colors to white.

Figure 3:
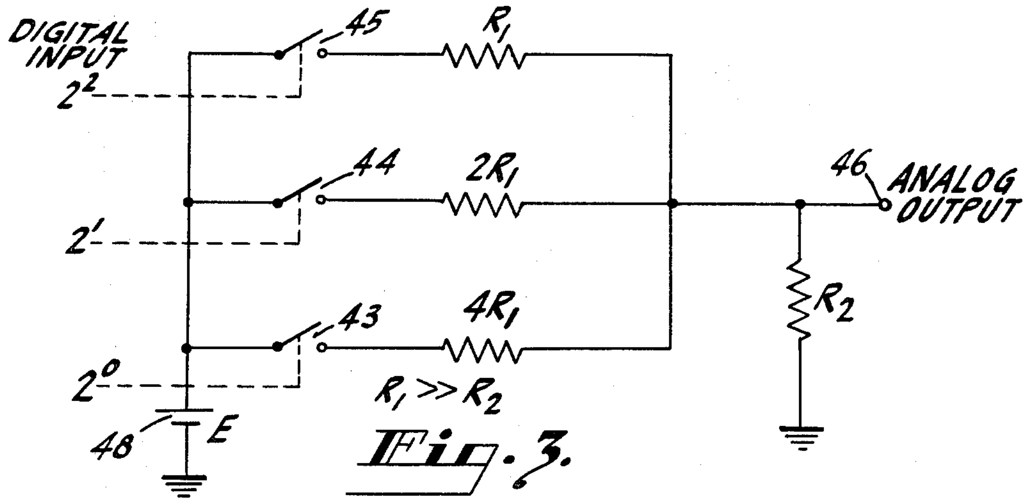
FIG. 3 is a circuit diagram of a digital-to-analog encoder useful in the system of FIG. 1.

FIG. 3 shows a suitable electric circuit for use as the encoder in the system of FIG. 1. The circuit of FIG. 3 includes three binary inputs labeled $2^0$, $2^1$ and $z^2$. The binary signals on the inputs control switches 43, 44 and 45, respectively, which may be transistor switches. The switches are connected through respective resistors $4R_1$, $2R_1$ and $R_1$ to an output terminal 46. A resistor $R_2$ is connected from the output terminal to a point of potential referenced to the potential at one terminal of a battery 48. The analog output voltage at terminal 46 depends on the open or closed condition of the switches 43, 44 and 45. For example, if all three switches are open, the output voltage is $V_o$, which is zero and represents black as shown in FIG. 2. On the other hand, if all three switches are closed, the voltage at output terminal 36 is a maximum value $V_w$ representing white. Different combinations of closed an open switches provide the intermediate output voltages designated $V_r$ through $V_y$ in FIG. 2.

Returning storage FIG. 1, the analog output 46 of the encoder 42 is applied through provides write gate 50 to the video input terminal 12′ of the storage tube 10 under The read of a write signal over line 22′ from the mode the mode 24.

The storage tube 10, when controlled over line 26 to operate in the read mode, provides a video output signal on line 52 which is applied to a read gate 54. The read gate is enabled by a signal on line 26′ from the mode control 24 to pass the video signal over line 56 to an analog-to-digital converter or decoder 62.

Figure 4:
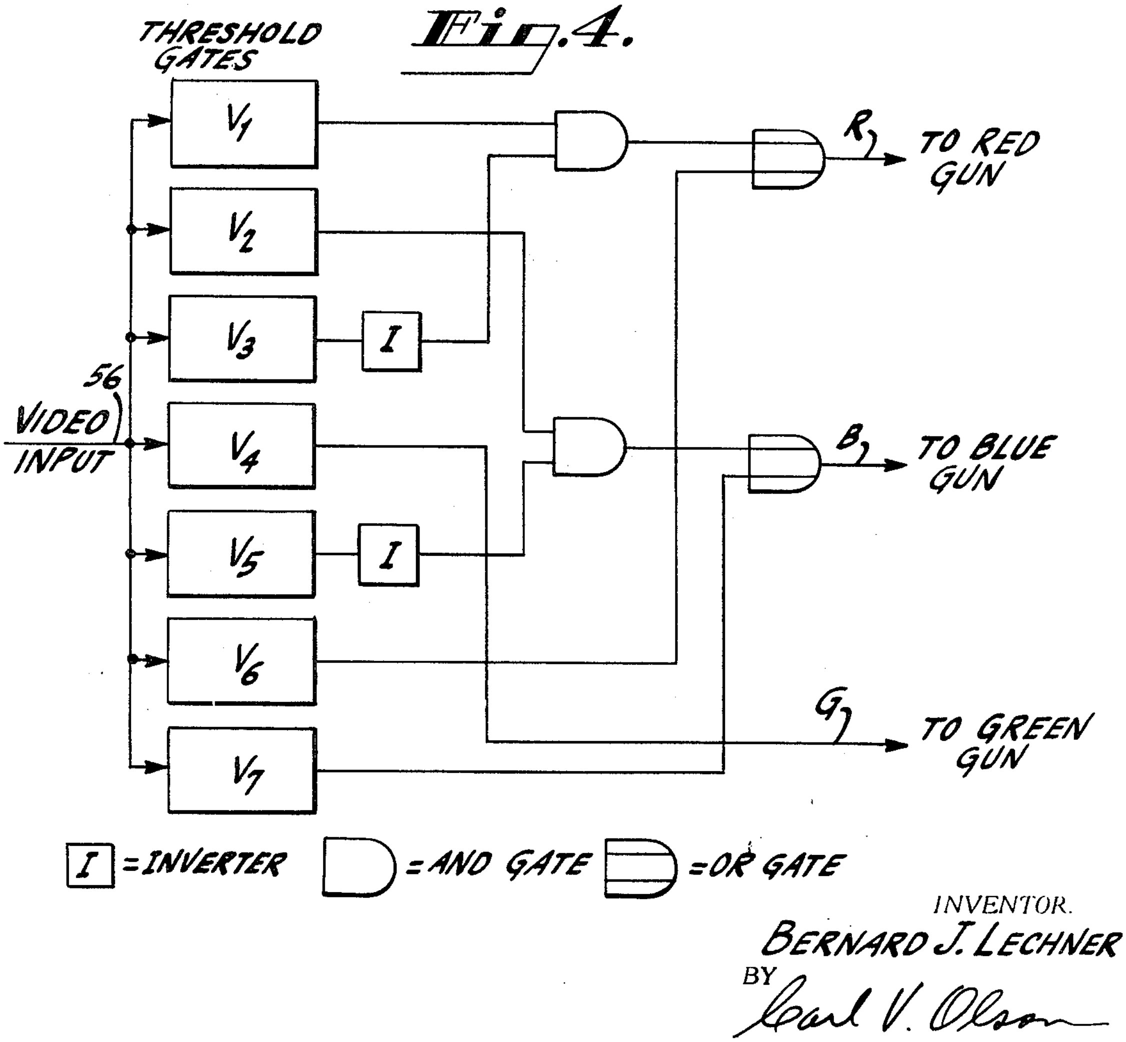
FIG. 4 is a diagram of an analog-to-digital decoder useful in the system of FIG. 1.

The decoder 62 may be constructed as shown in FIG. 4 to include a plurality of threshold gates $V_1$ through $V_7$. Each threshold gate is conductive and provides an output signal when the amplitude of video input signal is equal to or greater than a corresponding threshold amplitude. The various respective amplitudes are indicated in FIG. 2 as amplitudes $V_1$ through $V_7$. The outputs of the threshold gates are variously connected, as shown, through inverters, "and" gates and "or" gates to three output lines labeled R, B and G. The logic performed by the gates, and the connections shown in FIG. 4, are effective to generate on the output lines R, B and G either three zero voltages representing black, signals on all output lines representing white, signals on one of the three lines representing one of the respective colors red, blue or green, or outputs on two of the three lines representing mixed colors including magenta, cyan and yellow.

The color kinescope or color television picture tube 12 in FIG. 1 includes input terminals R, B and G for controlling the on-off condition of the three electron beam guns in the color kinescope. The kinescope 12 also includes beam deflection means designated 58 which is supplied with $x$ and $y$ deflection waveforms from a raster scan generator 60. The deflection waveforms from the raster scan generator 60 are also supplied over lines 20 to the deflection control unit 16, from which they may be supplied to the storage tube 10. When the raster scan generator 60 is connected to supply deflection waveforms to the storage tube 10 as well as to the color kinescope 12, the raster scanning in the storage tube and the kinescope are synchronized with each other.

In the operation of the system of FIG. 1, computer-generated digital information is supplied to the input register 30 for used by the vector scan generator 36, the encoder 42, and the mode control unit 24. The vector scan generator 36 generates deflection waveforms for the storage tube 10 in the manner described in the aforementioned paper by MIller and Wine. Simultaneously, the encoder 42 translates the three binary bits on lines 38 to an amplitude-modulated analog signal representing one of a plurality of colors including white and black. For example, the three binary bits may be 011, which are translated to an analog signal 70 shown in FIG. 2. The control bits on lines 40 cause the mode control 24 to enable the write gate 50 to pass the amplitude-modulated color-representing video signal 70 to the video input of the storage tube 10. The simultaneous effect of the deflection signal applied over lines 14 and the video signal applied over line 12′ is to store a line of charge on the target on the storage tube with an amplitude representing a particular color, which is blue in this example. When this has been accomplished, the input register 30 receives another set of binary bits which determine the next following deflected location of a line to be stored. If the binary bits are 101, the encoder 42 generates an analog signal 72 which has an amplitude representing green and which is stored as a line of charge of corresponding amplitude on the storage tube target. This procedure is repeated until an entire graphic display is stored on the target in the storage tube 10.

The final digital signal supplied through the input register 30 includes a bit conveyed over line 40 to the mode control 24 commanding the mode control to order the discontinuance of writing (storage) and the commencement of reading (display).

When the system is in the read or display mode, the raster scan generator 60 supplies synchronous deflection waveforms to both the storage tube 10 and color kinescope 12. The video output signal from the storage tube on line 52 is then passed through the enabled read gate 54 and over line 56 to the decoder 62. The decoder 62 continuously translates the amplitude of the video signal to on-off signals on the three outputs R, B and G connected to the red, green, and blue electron guns in the kinescope 12. In this way, the colored graphic information stored as amplitude variations of charge on the target of the storage tube is reproduced in color on the face of the color kinescope 12.

The raster scanning of the storage tube and the reproduction of the color image on the color kinescope is continuously repeated until a degradation occurs in the charge patterns stored on the target of the storage tube 10. At this time, the system is returned to the write or storage mode and computer-supplied digital signals again control the storage of the same or different graphic material on the target of the storage tube 10. An electrical storage tube can be repeatedly read out for a period of time of several, or many, minutes before it is necessary to again write the same or different graphic material on the target of the storage tube. The computer controlled storage of graphic material is accomplished relatively very rapidly, in a few seconds or less. If it is desired to display the graphic image for a length of time during which there is some leakage of charge in the storage tube, it may be desirable to add an automatic gain control circuit in an amplifier forming a part of the read gate 54. The automatic gain control circuit can be constructed to maintain constant amplitudes of signals to the decoder 62 despite a gradual attenuation of the signal from the storage tube due to leakage of stored charges.

While the system of FIG. 1 has been described as including a vector scan generator 36 for controlling the deflection of the storage tube during the writing in of information to the storage tube, it will be understood that other known systems of controlling the storage of information in the storage tube 10 may be employed if desired.

Also, while the system of FIG. 1 has been described using a single-gun storage tube which must be switched between the write, read, and erase modes, it will be understood that other known multiple-gun storage tubes can be used. In such case, the mode control 24, deflection control 16, write gate 50, and read gate 54 are not required. Deflection signals 20 are always supplied to the deflection means for the read gun, and deflection signals 18 are always supplied to the separate deflection means for the write gun. Similarly, video signal 46 is always applied to the write gun and video signals 56 are always obtained from the read gun. With such a multiple-gun storage tube, reading and writing occurs independently and simultaneously.

What is claimed is:

1. In combination, an electrical storage tube including deflection means and a video signal output terminal, means to store graphic material in said storage tube with amplitude variations representing different colors, a color display device including deflection means synchronizable with the deflection means of said storage tube, and including color control signal input terminals, and means to translate the amplitude modulated signal from the video signal output terminal of said storage tube to signals for application to said color control signal input terminals of said color display device.

2. The combination defined in claim 1 wherein said color display device is a color kinescope.

3. The combination of, a source of digital signals which represent graphic material, an electrical storage tube having beam deflection means and a video signal output terminal, means responsive to said digital signals to store said graphic material in said storage tube as a pattern of stored charges of varying color-representing amplitudes, a color kinescope having beam deflection means and having red, green and blue signal input terminals, means to synchronize the beam deflection means of said storage tube and said color kinescope, and threshold detector means responsive to the video output signal of said storage tube to generate and supply signals to the red, green and blue terminals of said kinescope, whereby said graphic material is reproduced in color on the face of said color kinescope.

4. The combination of, a source of digital signals, including position information bits and color information bits, which represent graphic material, an electrical storage tube having beam deflection means, a video signal input terminal and a video signal output terminal, means responsive to said position information bits to control said beam deflection means, digital-to-analog converter means responsive to said color information bits to generate and supply a signal having an amplitude determined by said color information bits to said video signal input terminal, whereby said graphic material is stored in said storage tube as a pattern of stored charge amplitudes, a color kinescope having beam deflection means and having red, green and blue signal input terminals, means to synchronize the beam deflection means of said storage tube and said color kinescope, and threshold detector means responsive to the video output signal of said storage tube to generate and supply signals to the red, green and blue terminals of said kinescope, whereby said graphic material is reproduced in color on the face of said color kinescope.

UNITED STATES PATENT OFFICE
CERTIFICATE OF CORRECTION

Patent No. 3,603,962 Dated September 7, 1971

Inventor(s) Bernard Joseph Lechner

It is certified that error appears in the above-identified patent and that said Letters Patent are hereby corrected as shown below:

In column 2, line 46, "Gfaphics" should read ---Graphics---; line 68, "$z^2$" should read ---$2^2$---.

In column 3, line 8, "storage" should read ---to---; line 9, "provides" should read ---a---; line 10, "The read" should read ---the control---; line 11, "the mode" (second occurance) should read ---control---; line 50, "used" should read ---use---.

Signed and sealed this 28th day of March 1972.

(SEAL)
Attest:

EDWARD M.FLETCHER,JR.
Attesting Officer

ROBERT GOTTSCHALK
Commissioner of Patents

Disclaimer 3,603,962.—*Bernard Joseph Lechner*, Princeton, N.J. COLOR DISPLAY FOR COMPUTER TERMINAL. Patent dated Sept. 7, 1971. Disclaimer filed Sept. 1, 1972, by the assignee, *RCA Corporation*.

Hereby enters this disclaimer to all claims of said patent.

[*Official Gazette January 16, 1973.*]